Figure 1:
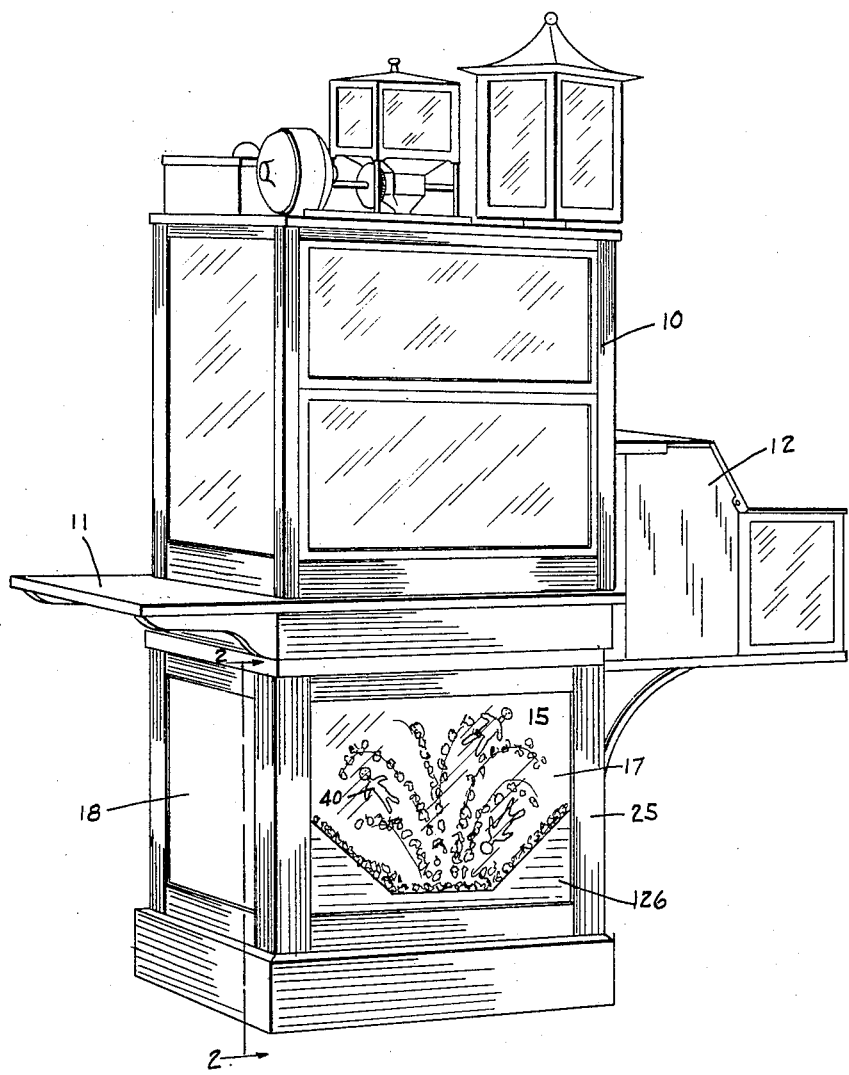

E. C. BOOTH.
DISPLAY DEVICE.
APPLICATION FILED DEC. 23, 1919.

1,350,542.

Patented Aug. 24, 1920.
2 SHEETS—SHEET 1.

INVENTOR.
EARL C. BOOTH
BY
Lockwood & Lockwood
ATTORNEYS.

E. C. BOOTH.
DISPLAY DEVICE.
APPLICATION FILED DEC. 23, 1919.
1,350,542.
Patented Aug. 24, 1920.
2 SHEETS—SHEET 2.
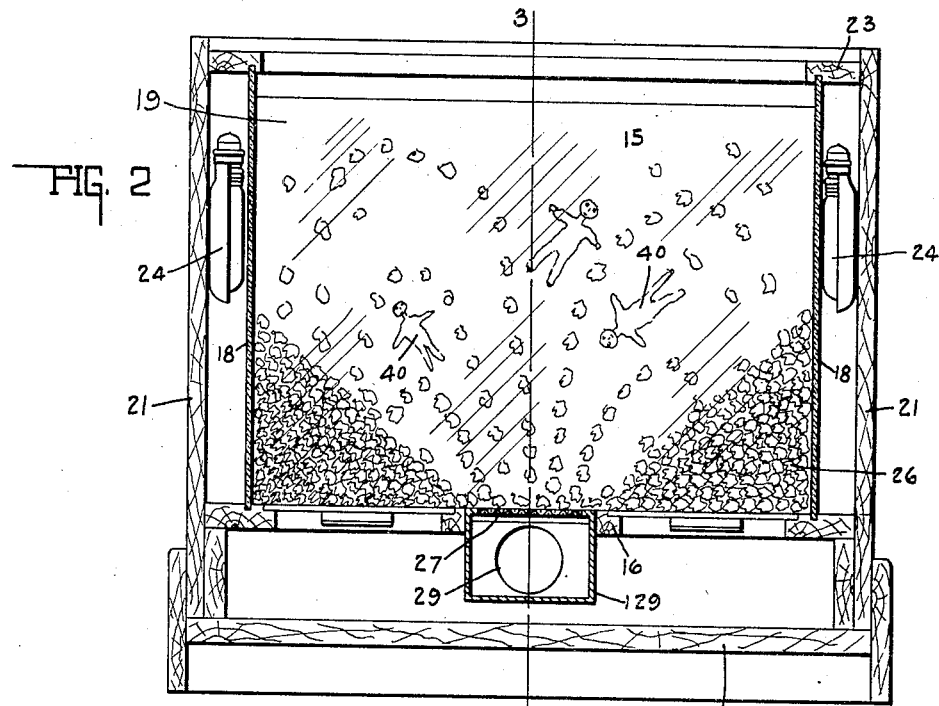
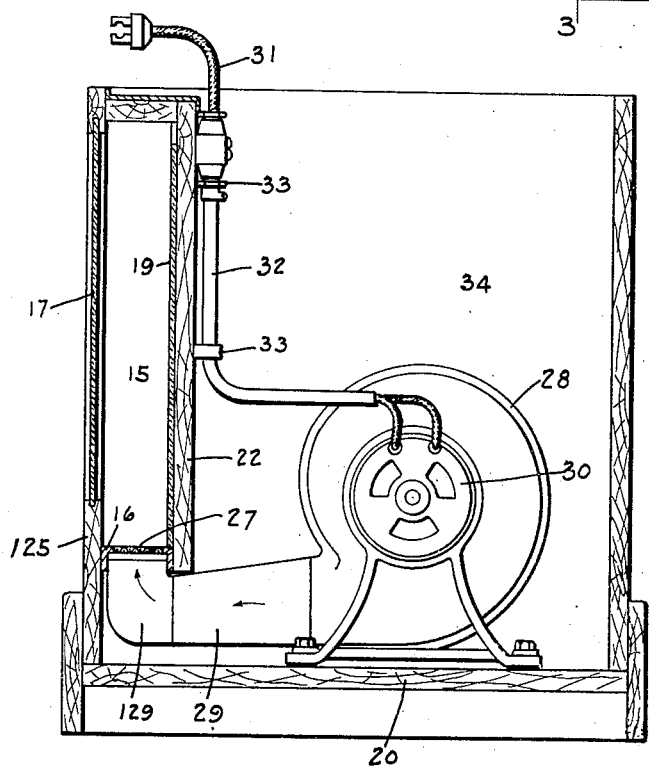
INVENTOR.
EARL C. BOOTH
BY
ATTORNEYS.

UNITED STATES PATENT OFFICE.

EARL C. BOOTH, OF INDIANAPOLIS, INDIANA, ASSIGNOR TO HOLCOMB & HOKE MANUFACTURING COMPANY, A CORPORATION OF INDIANA.

DISPLAY DEVICE.

1,350,542.  Specification of Letters Patent.  Patented Aug. 24, 1920.

Application filed December 23, 1919. Serial No. 347,029.

*To all whom it may concern:*

Be it known that I, EARL C. BOOTH, a citizen of the United States, and a resident of Indianapolis, county of Marion, and State of Indiana, have invented a certain new and useful Display Device; and I do hereby declare that the following is a full, clear, and exact description thereof, reference being had to the accompanying drawings, in which like numerals refer to like parts.

This invention relates to a display device for the purpose of calling attention to popped corn or other articles of merchandise being sold or to other advertising. While the machine herein shown is a corn popping and vending machine including said display device, the invention is not limited to a corn popping machine as the corn popping machine constitutes no part of this invention. The invention is susceptible of use in connection with any material which is relatively light in weight, like popped corn, and which can be blown upwardly in a spray or geyser-like form for attracting the attention of people to the articles of merchandise, or to any other thing.

The chief feature of the invention consists in the combination of the articles or material of light weight, a chamber for containing the same which is transparent so that the material is visible therein, and means for causing a blast of air up through an air inlet in the bottom of the chamber, preferably in the center of the chamber, whereby the material will be constantly blown upward like a spray. With a square chamber. as herein shown, the material, such as popped corn, accumulates in the corners and ends thereof so as to form piles of such material, inclined inwardly and downwardly to the air blast inlet and down which the popped corn or other material rolls, after it has been cast upward, and then returns again to the air blast inlet when it is again blown upward, and this movement is constantly repeated. When the popped corn or other material is thus accumulated around the air blast inlet, it will form a hopper-like air chamber in which there is a constant spray of the popped corn or other material which attracts the attention of the public. Other articles of merchandise or other material which is relatively light in weight, like popped corn, are susceptible of being blown upward by the air blast in the manner described, may be employed.

Another feature of the invention consists in placing in such chamber provided with an air blast inlet, preferably centrally located, light weight figures like celluloid dolls or light weight imitations of animals, so that the blast will blow them upwardly repeatedly and cause them to perform antics which attract attention. Preferably these are used in combination with the popped corn or articles of merchandise so that these figures will also roll down the inclined pile of popped corn or the like to the air blast inlet, and then receive another blast of air which will carry them upward.

In addition to the foregoing is the provision of a mirror in the rear wall of said chamber for reflecting the movements of the popped corn or the like and of the celluloid or other light figures and thus make the device more interesting.

This display device operating in the manner herein set forth, in a public place or in a show window of a store, will constantly hold a crowd of onlookers, which renders it a successful advertising medium.

The foregoing and other features of the invention will be understood from the accompanying drawings and the following description and claims.

In the drawings Figure 1 is a perspective view of a corn popping machine having said display device in the lower half or portion thereof. Fig. 2 is a central vertical section through said display device on the line 2—2 of Fig. 1. Fig. 3 is a section through the device on the line 3—3 of Fig. 2.

The device constituting this invention forms the lower part or half of the corn popping machine shown in Fig. 1. The upper portion 10 is a glass case within which suitable means is provided, not shown, for popping the corn. On one side there is a shelf 11 and on the other side there are receptacles 12 for handling the popped corn or other material. The foregoing constitutes no part of this invention, but the invention has heretofore been used as herein shown. The corn after it is popped is deposited in the display device under the corn popping chamber 10.

The display device includes a chamber 15 formed with a bottom 16, a front side 17 of glass, ends 18 of glass and a rear wall 19 consisting of a mirror. Herein the chamber is shown rectangular, but it need not necessarily be that form.

Said display chamber is located within a cabinet having a bottom 20, end walls 21, a back wall 22 and a skeleton top frame 23 the central portion of which is open and in communication with the corn popping machine above, although this feature is not necessary to this invention. Between the end glass plates 18 and the end cabinet walls 21, lamps 24 are located for illuminating the interior of the chamber. The front glass wall 17 of the chamber is mounted in a skeleton frame 25 with an opaque plate 125 which extends up above the bottom 16 some distance, as shown in Figs. 1 and 3, so as to hide to some extent the piles 26 of popped corn which accumulate in the corners of the box and around the air blast inlet 27. Therefore, said opaque wall 125 at the middle portion extends up for a slight distance, as seen also in Fig. 3, and at the ends extends up at an incline for a considerable distance, but the opaque wall 126 does not hide the upper and inclined surfaces of the popped corn, as shown in Fig. 1.

The display chamber is not very deep, as shown in Fig. 3, and the air blast inlet 27 extends for the full depth thereof and is located midway the ends of the chamber, as shown in Fig. 2, so that it is at the middle of the chamber. That inlet is provided with a perforated wire netting to permit the passage upward of the air, but to prevent any of the popped corn 26, or other article whatever it may be, from passing down through the air inlet 27. The air blast is supplied by the fan 28 through the chute 29 and air box 129. The fan is driven by an electric motor 30 with which wiring 31 is connected, said wiring passing through the tube 32 which is secured to the wall 22 by the brackets 33. The fan construction is within the large chamber 34 under the corn popping mechanism and behind the display chamber.

Within the display chamber a number of light weight figures 40 of animals or persons are placed, preferably made of celluloid and hollow so that the air blast can easily blow them upward.

In the operation of this display device, the popped corn or other material accumulates in and fills the lower corners of the chamber on each side of the air blast inlet, and therefore the upper surface of the pile of popped corn or the like extends inwardly and downwardly at an inclination, leaving between the two piles of popped corn or the like a hopper-like air chamber with the air blast inlet at the lower apex thereof. The grains of popped corn roll down said inclined surface of popped corn upon the wire netting in the air blast inlet, come into the path of the air blast and are blown upwardly like a spray continually with great rapidity of movement. In going upward they usually curve outward and fall down again on the inclined surfaces of the piles of popped corn or the like and roll back into the path of the air blast. If this process continues when the device is placed where the public can see the same, it attracts attention.

The celluloid dolls or other figures 40 are blown upwardly in the same way by the blast along with the popped corn or the like and assume various positions and perform various antics in their movement upward and downward. They also often fall on the inclined surfaces of the piles of popped corn or the like and that causes them to roll down repeatedly into the path of the air blast. These figures 40 often seem to be attacking, wrestling or playing with each other and are interesting, particularly to children.

As stated before, instead of popped corn, peanuts or other articles can be used in the display device. In accomplishing the purpose of this invention, that is in attracting the attention of the public, the popped corn or other light material, the celluloid or other light figures 40, the chamber in which they are located, and the air blast means all coöperate.

The invention claimed is:

1. A display device for vending machines including a display chamber having a transparent front and adapted to be partially filled with articles to be displayed, and means for upwardly projecting the articles to be displayed, whereby they will attract attention.

2. A display device for vending machines including a display chamber having a transparent front and adapted to be partially filled with articles to be displayed, and means for projecting upwardly a portion of the articles to be displayed to form a fountain effect of the same, the remainder of the displayed articles forming substantially a hopper-like bottom.

3. A display device including a transparent chamber adapted to receive light solids such as popped corn or the like, and means for causing an upward air blast through an inlet in the bottom of said chamber limited to a portion of the bottom thereof, whereby a spray of the solids will be constantly blown upward in the chamber.

4. A display device including a chamber, air blast means with an air blast inlet limited to a portion of the bottom of said chamber, relatively light figures representing animal life located in said chamber, and means in said chamber beside the air blast inlet for causing said figures to roll down toward the air blast inlet, whereby the air blast will repeatedly blow them upward substantially as set forth.

5. A display device including a rectangular chamber with a transparent wall to render the contents thereof visible, air blast means with an air blast inlet located in a limited portion of the bottom of said chamber, and relatively light solids in said chamber, whereby such solids as come within the path of the air blast will be blown upward in a spray for the display thereof.

6. A display device having a chamber with a glass front and glass ends, a cabinet containing said chamber, lights between the glass ends of the chamber and the ends of the cabinet, air blast means with a discharge inlet located in a limited portion of the bottom of said chamber, and relatively light solids located in said chamber and which in the operation of the device will be blown upwardly in a spray by the air blast and be illuminated for the display thereof.

7. A display device including a rectangular chamber having a skeleton frame at the front thereof with a horizontal portion extending upward from the bottom at the middle of said chamber and triangular portions at each lower corner, a glass partition in said skeleton frame, an air blast means with an air blast inlet located in a limited portion of the bottom of said chamber, relatively light solids in said chamber, whereby said solids coming within the path of the air blast will be blown upward in a spray, and means for causing said solids to return to the path of the air blast.

8. A display device including a chamber, air blast means with an air blast inlet limited to a portion of the bottom of said chamber, relatively light figures representing animal life located in said chamber, and relatively light solids such as popped corn or the like in said chamber accumulated in the bottom thereof at each side of the air blast inlet in position to be repeatedly blown upward by the air blast for displaying said solids.

9. A display device including a chamber having a transparent front wall and a mirror in the back wall, said chamber adapted to receive light solids such as popped corn or the like, and means for causing an upward air blast through an inlet in the bottom of said chamber limited to a portion of the bottom thereof, whereby a spray of the solids will be blown substantially upward in the chamber.

In witness whereof, I have hereunto affixed my signature.

EARL C. BOOTH.